Inventor:
Henry S. Spacil,
by [signature]
His Attorney.

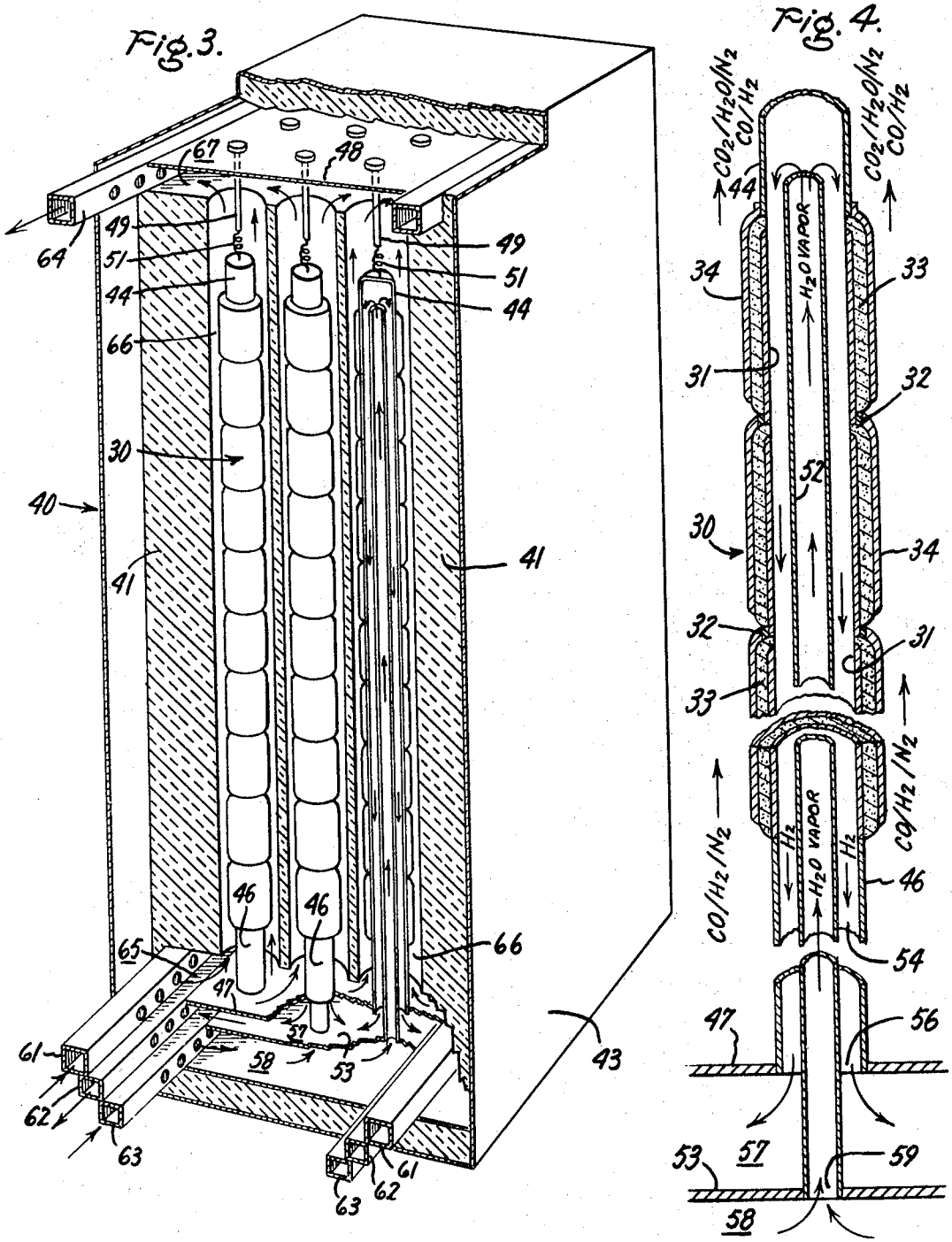

United States Patent Office 3,556,749
Patented Jan. 19, 1971

3,556,749
APPARATUS AND METHOD FOR THE
HYDROGENATION OF COAL
Henry S. Spacil, Schenectady, N.Y., assignor to General
Electric Company, a corporation of New York
Filed July 5, 1968, Ser. No. 742,824
Int. Cl. C10j 3/00, 3/06
U.S. Cl. 48—77                6 Claims

ABSTRACT OF THE DISCLOSURE

The conversion of coal to methane by reaction thereof with hydrogen gas at elevated temperatures and pressures in the presence of a catalyst in a gasifier apparatus wherein the hydrogen gas required is supplied by the dissociation of water vapor. Power for the dissociation is generated in a power station in which carbonaceous char (which is a by-product of the coal hydrogenation occurring in the gasifier) and air (which may, if desired, be enriched by oxygen produced during the dissociation) are burned. The dissociation is accomplished in solid oxygen-ion electrolyte cells preferably operating at temperatures in excess of 800° C.

BACKGROUND OF THE INVENTION

The gasification of coal at mine-mouth locations has already been proposed as a method of utilizing coal as a basic source of energy. The basic process employs the partial hydrogenation of coal at elevated temperatures and pressures. A source of hydrogen is, therefore, required for coal gasification and one such method already proposed for hydrogen generation utilizes the reaction of water vapor with the carbonaceous char that is a by-product of the partial hydrogenation of coal. The reaction between water vapor and the heated carbonaceous char produces a mixture of hydrogen and carbon monoxide, which thereafter is reacted in a shift reactor with additional water to yield a mixture of carbon dioxide and hydrogen. This hydrogen can be separated from the carbon dioxide and is then available for the hydrogenation of the coal to ultimately produce methane for distribution through pipeline networks such as are currently used for natural gas transmission. Other chemical methods for hydrogen generation have also been proposed.

It would be of particular advantage to be able to significantly improve the economies of the above-outlined process and this need is met with the instant invention in which the dissociation of water vapor is accomplished in solid oxygen-ion electrolyte cells in combination with coal gasification equipment.

SUMMARY OF THE INVENTION

Solid oxygen-ion electrolyte cells operating over 800° C. are integrated into a coal gasification plant for the generation of hydrogen and, if desired, oxygen by the dissociation of water vapor. Carbonaceous char from the gasification process is used as the basic fuel for a thermal power station to provide electrical power for accomplishing the dissociation.

This specific dissociative generation of hydrogen for the hydrogenation process replaces any specific hydrogen generation process such as the earlier contemplated endothermic reaction between carbonaceous char and water to produce a hydrogen/carbon monoxide mixture, which would in turn require further reaction with additional water in a shift reactor to produce a hydrogen/carbon dioxide mixture from which the carbon dioxide must be removed.

BRIEF DESCRIPTION OF THE DRAWING

The exact nature of this invention as well as objects and advantages thereof will be readily apparent from consideration of the following specification relating to the annexed drawing in which:

FIG. 3 is a perspective view partially cut-away of a steam dissociation module housing a hexagonal array of multicell stacks of solid oxygen-ion electrolyte cells, and FIG. 4 is an enlarged view shown in cross-section of one of the solid electrolyte multicell stacks employed in FIG. 3.

DESCRIPTION OF THE PREFERRED EMBODIMENT

Figure 1:
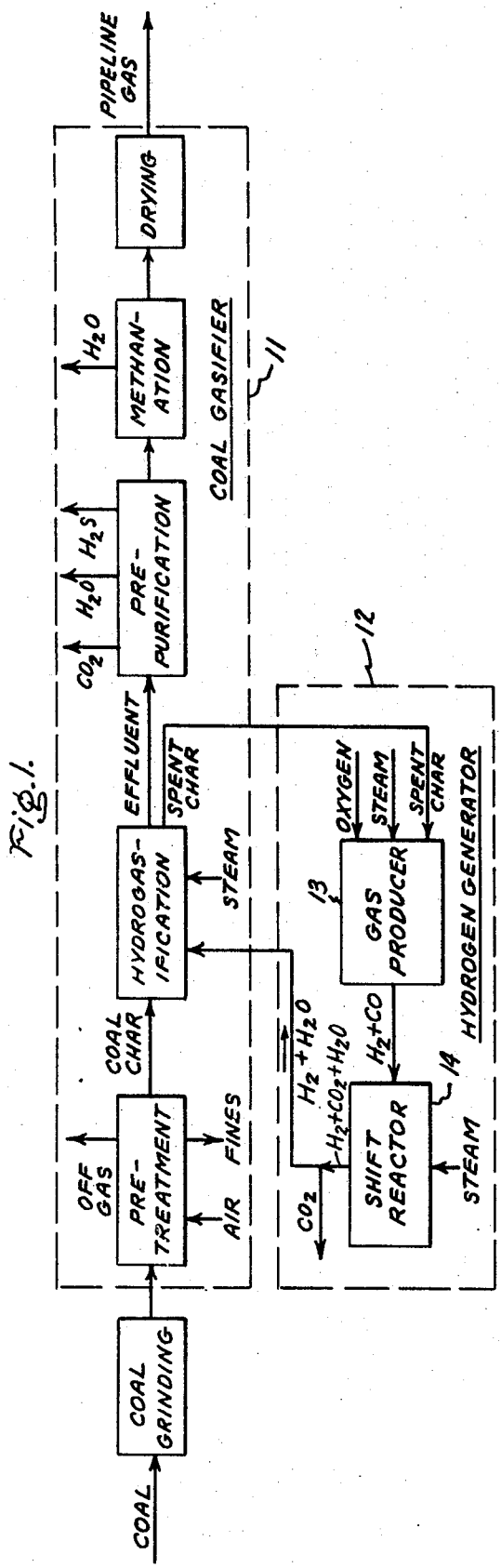
FIG. 1 is a flow diagram for a prior art coal gasification process showing the relationship between the several pieces of apparatus.

The flow sheet of FIG. 1 schematically represents an arrangement of apparatus in a prior art process for the partial hydrogenation of coal at elevated temperatures and pressures.

In coal gasification in gasifier 11 coal from storage is ground and this powdered coal receives pre-treatment wherein heat (about 750° C.) and air are introduced to drive off volatiles. The coal char produced is passed to the hydrogasification equipment wherein at about 1000° F. and under pressure of about 1100 p.s.i.g. in the presence of steam and hydrogen a mixture of gases consisting principally of $H_2$, $H_2O$, $CH_4$, $CO$ and $CO_2$ is produced by partial hydrogenation of the coal char. The spent char is used at another point in the process. This mixture of gases is subjected to a purification step to produce a methanation feed gas comprising primarily $H_2$, $CH_4$, $CO$ and $CO_2$. Methanation and drying produce pipeline gas from the methanation feed, which pipeline gas is predominately methane with a small amount of hydrogen and minor amounts of $CO$, $CO_2$ and $N_2$.

The spent carbonaceous char from the hydrogasification step is made use of in the generation of hydrogen in hydrogen generator 12 in an endothermic reaction.

Steam, oxygen and carbonaceous char are reacted in gas producer 13 to produce a mixture of hydrogen and carbon monoxide containing some water vapor and carbon dioxide as a result of oxidation by the oxygen which is required to provide the heat for the endothermic reaction of char and steam. This mixture of gases is introduced into shift reactor 14, steam is also introduced therein and the resultant reaction produces a mixture of hydrogen, water vapor and carbon dioxide. The carbon dioxide content is removed by conventional techniques. The hydrogen therefrom which may contain some water vapor, is pressurized and introduced into coal gasifier 11 at the hydrogasification stage. The process can be made completely self-sufficient if enough power can be obtained from the process streams to obtain oxygen for the gas producer and heat for the hydrogasifier which is endothermic. It has been proposed to employ the mechanical energy of the hot, pressurized effluent gas mixture from the hydrogasifier to operate a cryogenic air separation plant to produce oxygen. A turbine would convert this mechanical energy into power for compressors required in a cryogenic air separation plant. It has also been proposed to heat the gas producer electrically by passing a current through the granular char in the gas producer. The electrical energy would be obtained by using either some of the char or a portion of the effluent gas streams from the gas producer or the hydrogasifier to operate a power plant. This plant could be a conventional thermal plant. Since either alternating or direct current would be satisfactory for resistance heating of the gas producer, fuel cell and magnetohydrodynamic power plants have also been proposed as the sources of the necessary electrical energy.

Figure 2:
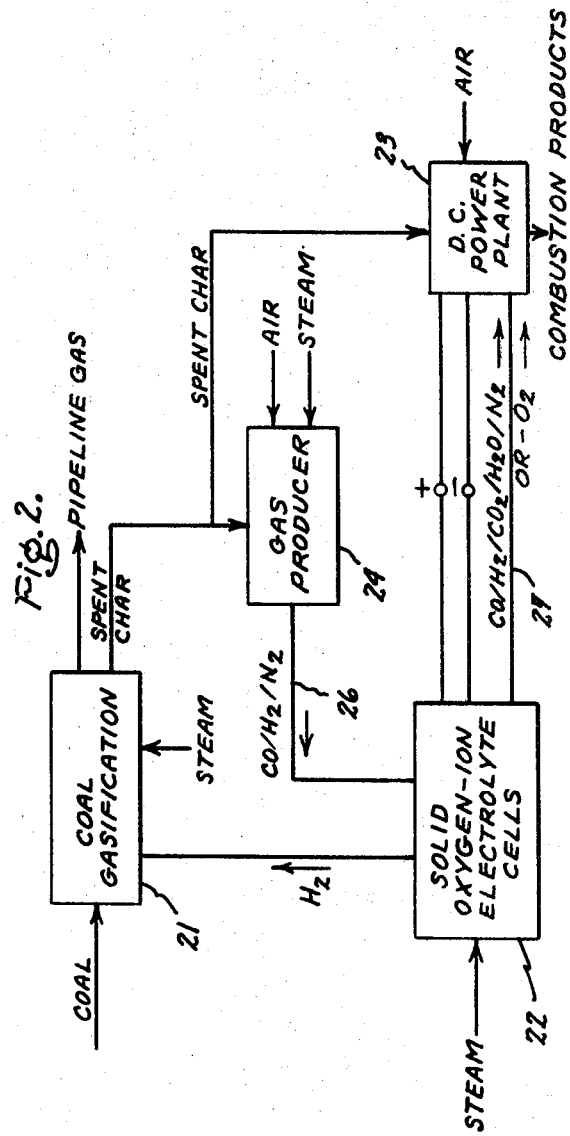
FIG. 2 is a flow diagram of one version of the instant invention showing the relationship of the several pieces of apparatus.

The improved cycle of the instant invention is shown in FIG. 2. The coal gasifier apparatus 21 may be the same as the conventional coal gasifier apparatus 11 of FIG. 1, however, in place of the combination of gas producer 13 and shift reactor 14 to produce hydrogen for this process, the hydrogen required for the hydrogasification is produced by the dissociation of water vapor in the solid oxygen-ion electrolyte cell modules 22. The electric power required to operate the oxygen-ion electrolyte dissociation cells is produced in power station 23 either by the combustion of spent char (from gasifier 21) with oxygen-enriched air or by the combustion of a partially oxidized reducing gas. Whether oxygen to enrich the combustion air gas is available depends upon the mode of operation of cell modules 22, since in either case the effluent from the anode region is the source of these gases. Straightforward water vapor dissociation in cell modules 22 results in oxygen as the gaseous effluent from the anode region. In the improved water vapor dissociation to be described below reducing gas, e.g., a reducing gas mixture is introduced to the anode region of cell modules 22 to take up the oxygen evolved there. If a large enough flow of reducing gas is used, the flow is only partially oxidized and the unoxidized gas content is available for further combustion. The water to be dissociated is introduced into cells 22 as steam. Hot combustion products from the power station 23 may be used to vaporize the liquid water and to superheat the steam feed for dissociative cell modules 22, which is preferably operated at temperatures in excess of 800° C. Cell heating is accomplished by a combination of internal or external electric resistance heating plus the Joulean heating of the cell electrolyte itself due to the passage of the dissociating current therethrough.

As will be described below in connection with FIGS. 3 and 4 the preferred arrangement and operation of cell module 22 provides for the introduction of reducing gas to the anode of each cell in which case reaction occurs with the oxygen leaving the anode and no oxygen remains available as by-product of the dissociation. This reducing gas can be obtained from gas producer 24 via conduit 26 by reacting steam, air and carbonaceous char to produce a mixture of hydrogen, carbon monoxide and nitrogen containing some water vapor and carbon dioxide as a result of oxidation by the air which is required to provide the heat for the endothermic reaction of char and steam. If this gas is only partially oxidized in passing over the anodes of cell modules 22 it can be introduced via conduit 27 as a fuel for power station 23. In this case no oxygen will be available for enriching the combustion air since the oxygen evolved at the anodes of cell module 22 will combine with the reducing gas from gas producer 24.

The construction of an exemplary solid oxygen-ion electrolyte cell will be described in detail in connection with FIG. 4; however, in general, the construction of the cell stack shown in FIG. 4 is substantially in accordance with the disclosure in application Ser. No. 465,624, White (now U.S. 3,402,230), filed June 21, 1965. Various electrode and electrolyte constructions for use in such a cell stack are described in the following patent applications: Ser. No. 645,288, Mitoff, filed June 12, 1967; Ser. No. 680,245, Spacil (now U.S. 3,503,809), filed Nov. 2, 1967; and Ser. No. 645,423, Tedmon et al. (now U.S. 3,516,865), filed June 12, 1967. All of the above-mentioned patent applications are assigned to the assignee of the instant invention and all are incorporated by reference herein.

Although the preferred oxygen-ion material for the practice of this invention is solid stabilized zirconia, other solid oxygen-ion materials, as for example, ceria-doped lanthanum oxide, which is described in an article by Takahashi, Ito and Iwahara in Denki Kagaku, 34, 205–209 (1966) are satisfactory.

Zirconia may be purchased commercially either already stabilized or in a relatively pure state for stabilization (conversion from monoclinic zirconia to cubic zirconia) by the user. Typical analyses of the prestabilized and unstabilized zirconias used in the practice of this invention are set forth below:

PRE-STABILIZED

| | |
|---|---|
| $ZrO_2$* | 93.94 |
| $SiO_2$ | 0.62 |
| $Fe_2O_3$ | 0.10 |
| $TiO_2$ | 0.11 |
| CaO | 4.80 |
| MgO | 0.25 |
| $Al_2O_3$ | 0.18 |
| Total | 100.00 |

UNSTABILIZED

| | |
|---|---|
| $ZrO_2$* | 99.08 |
| $SiO_2$ | 0.18 |
| CaO | 0.22 |
| MgO | 0.15 |
| $Fe_2O_3$ | 0.10 |
| $Al_2O_3$ | 0.16 |
| $TiO_2$ | 0.11 |
| Total | 100.00 |

* Traces of $HfO_2$.

Solid stabilized zirconia is a compound with a cubic crystal structure consisting of zirconia to which has been added calcium oxide, magnesium oxide, yttrium oxide, ytterbium oxide, or a mixture of rare earth oxides. For example, a preferred solid zirconia member employed as an electrolyte is stabilized with 11 molecular percent calcium oxide. Other stabilized zirconias, which may also be employed as solid electrolytes are discussed in "Oxide Ceramics," by Ryshkewitch, Academic Press, 1960, particularly on pages 354, 364 and 376 thereof.

A preferred design for a solid oxygen-ion electrolyte cell module is illustrated in FIG. 3 and a subassembly of solid electrolyte cells disposed in the stack arrangement shown in FIG. 3 is shown in enlarged view in FIG. 4. The preparation of the stack cell arrangement is largely described in the aforementioned application Ser. No. 465,624, White.

Stack 30 is made by (a) depositing a first electrode material (for example, porous nickel-zirconia cermet) in separate annular segments 31 with integral metal ring connector 32 (for example, nickel) along the length of a mandrel (not shown), (b) depositing thereover an annular coating 33 of solid oxygen-ion electrolyte (for example, yttria-stabilized zirconia sintered with iron oxide additive) covering the outer surface of each of the electrode segments 31 so that only one end of each segment 31 is completely covered (ring connector 32 remaining exposed), (c) depositing an outer layer of electrode material (for example, porous nickel-zirconia cermet) in the form of annual electrode segments 34 on the electrolyte layer 33 so that at one end each top layer segment 34 contacts the exposed ring connector 32 of the adjacent first electrode segment 31 and (d) removing the mandrel as, for example, by chemical etching.

The composite tube so created is then heat treated to obtain optimum densification of the stabilized zirconia electrolyte segment 33. A set of contiguous super-imposed layers 31, 33, 34 constitute a single cell. In the form illustrated, the stack of cells are electrically and chemically connected in series as a self-supporting, gas-tight tubular structure. Module 40 houses a hexagonal array of stacks 30 positioned vertically in rows. Each stack 30 is enclosed in thermal insulation 41 spaced therefrom to permit the passage of gas as will be described hereinbelow and is maintained at operating temperature, preferably in excess of 800° C. The stacks 30 and the surrounding thermal insulation as, for example, aluminum silicate fibers are enclosed in metal housing 43. Other materials recited hereinbelow are, of course, also exemplary.

Nickel extension tube 44 at the upper end of each stack 30 is closed at the top while the bottom end of the lower nickel extension tube 46 is welded to tube sheet 47 of nickel, which also serves as a bus bar. Nickel plate 48 near the top of module 40 serves ae the second bus bar and is connected to each extension tube 44, each connection constituting a nickel rod 49 to which is affixed flexible nickel wire or braid 51. Therefore, although individual cells within a stack are electrically and chemically connected in series, the stacks 30 within module 40 are electrically connected in parallel. Each stack 30 has concentrically located therein a stainless steel tube 52 extending nearly the full length of stack 30 and, at its lower end, projecting beyond tube 46 to nickel tube sheet 53 to which it is welded. In this manner, annular space 54 between tube 52 and discontinuous electrode segments 31 is in flow communication (via hole 56) with plenum 57 while the interior of tube 52 is in flow communication with plenum 58 (via hole 59).

The gas flow handling metal ducts 61, 62, 63, 64 are in flow communication with the interior of module 40 in the following manner: each of ducts 61 are in communication with plenum 65 through holes in the side of each duct; plenum 65 is in flow communication with the annular space 66 around each stack 30; ducts 62 via similar holes are in flow communication with plenum 57 (and thereby with annular space 54 of each stack 30), and ducts 63 are in flow communication through holes in the side of these ducts with plenum 58 (and thereby with the interior of each tube 52). Plenum 67 is in flow communication with both the annular spaces 66 and duct 64 providing an outlet for the gas flow.

In the preferred construction illustrated ducts 61 are provided in order to introduce a reducing gas or gas mixture to the anodic electrode (segments 34 of each stack 30). For example, by supplying a reducing gas such as a $CO/H_2/N_2$ mixture to the anode, the voltage of the individual dissociative cells would be reduced by an amount in the order of from 0.6–1.2 volts. This voltage reduction (or depolarization) occurs, because the back electromotive force (EMF) of each dissociative cell would be reduced by this amount provided that sufficient reducing gas were supplied to the anode to combine with all of the oxygen evolved during the dissociation of water vapor. In this manner, the amount of electrical power required for the dissociation is substantially reduced.

A significant benefit of this mode of operation is the fact that both anodic and cathodic electrodes can be made of relatively inexpensive, high conductivity materials such as nickel or cobalt, because the gas mixtures to which all of these electrode surfaces are exposed can be kept non-oxidizing with respect to the metals of which the electrodes are made.

The invention broadly directed to the depolarization of a solid oxygen-ion electrolyte cell by the provision of means for supplying a reducing gas to the anode is described and claimed in U.S. patent application Ser. No. 742,653, Spacil, filed July 5, 1968. The combined chemical and electrical coupling of a hydrogen generator and a power generator is described and claimed in U.S. patent application Ser. No. 742,699, Aker et al., filed July 5, 1968. Both the last-mentioned patent applications are assigned to the assignee of the instant application.

Although the preferred embodiment employs a tube configuration for the solid oxygen-ion electrolyte cells, because of the capability for advantageously connecting such cell configurations in series electrically, other configurations such as sheet configurations may be employed and offer the advantage of greater packing density in multicell assemblages.

In operation, an electrical potential is imposed between sheet 47 and sheet 48 from a D.C. power source (e.g., power station 23), and water vapor (containing a small amount of hydrogen) is fed to space 54 via ducts 63, plenum 58 and tubes 52. The downwardly flowing water vapor in annulus 54 is progressively dissociated and emerges at the bottom as wet hydrogen gas entering plenum 57 and existing from module 40 via ducts 62. The oxygen removed from the water vapor is transferred to the anode side of each fuel stack 30 through the electrolyte segments 33 by the mechanism of oxygen-ion transport. The anode feed gas (reducing mixture $CO/H_2/N_2$) flows upward through annular spaces 66 between the anode surfaces of stack 30 and the surrounding thermal insulation, where it becomes progressively oxidized by the liberated oxygen gas so that the spent anode gas, which finally flows through passages in the thermal insulation into ducts 64 has been converted to a mixture of $$CO/H_2/CO_2/H_2O/N_2$$

The amount of unreduced water vapor present in the hydrogen effluent from ducts 62 will depend upon the particular levels of current and steam flow rate employed. If a sufficiently high current and sufficiently low flow rate are employed, it is actually possible to produce a flow of hydrogen having a dew point as low as $-70°$ F., although such operation is not recommended on a continuous basis. In a practical construction, it would appear to be more economical to dissociate somewhat less than all of the input steam and to trap out the excess water by cooling or adsorption in those instances in which it is desired that the hydrogen be provided dry.

The EMF which must be applied to each solid electrolyte cell must be sufficient to cover the voltage needed for water vapor dissociation plus the voltage required to effect oxygen-ion transfer (ohmic) and over-ride the nonohmic voltage drop encountered in the cell. Stabilized zirconia electrolyte cells are preferred because of their relatively small nonohmic overvoltages.

If the oxygen or if both the hydrogen and oxygen produced in the electrolyte are of interest the reducing gas would not be introduced in order to allow oxygen gas to be evolved at the anode. In such case, ducts 61 would not be required. Under such conditions, however, the anode electrode material would have to be one very resistant to oxidation at high temperatures, e.g., porous praseodymium cobaltate.

In plant operation, the annular spaces 66 are kept hot by Joulean heating of the stacks themselves. The temperature within module 40 is controlled by controlling current and/or gas flow rates; for example, by balancing the Joulean heat production with sensible and conduction heat losses.

Distinct advantages are offered in the cycle of the instant invention for the hydrogenation of coal. The dissociation of water vapor to yield hydrogen free of carbon monoxide and nitrogen may be accomplished with solid electrolyte cells utilizing a minimum of precious metals and the vaporization step to produce water vapor at some point preceding the solid electrolyte cell eliminates solid impurities and prevents cell contamination. Additionally, the necessity for employing a shift reactor for the conversion of carbon monoxide to carbon dioxide, and the necessity for providing oxygen for a nitrogen-free gas producer have been eliminated.

What I claim as new and desired to secure by Letters Patent of the United States is:

1. Apparatus for the production of pipeline gas comprising in combination:
   (a) means for the partial hydrogenation of coal,
   (b) means connected to said hydrogenation means for methanating gaseous effluent therefrom, and
   (c) means in flow communication with said hydrogenation means for generating hydrogen gas,
       (1) said hydrogen generating means comprising in combination a source of direct current power, at least one solid oxygen-ion electrolyte cell electrically connected thereto and a source of water vapor in flow communication with the cathode of said cell.

2. The apparatus for the production of pipeline gas substantially as recited in claim 1 wherein the source of direct current power is a thermal power station to which char from the hydrogenation means is supplied.

3. The apparatus for the production of pipeline gas substantially as recited in claim 2 wherein the at least one solid oxygen-ion electrolyte cell is a plurality of vertically disposed cell stacks located in spaced relationship in a housing.

4. The apparatus for the production of pipeline gas substantially as recited in claim 2 wherein the at least one solid oxygen-ion electrolyte cell comprises at least one vertically disposed hollow-center cell stack in which the individual cells forming said stack are electrically and chemically connected in series and said cell stack contains in the hollow center thereof separate conduit means for introducing steam therein.

5. The apparatus for the production of pipeline gas substantially as recited in claim 1 wherein the solid oxygen-ion electrolyte cell employs stabilized zirconia as the electrolyte.

6. In a process for the production of pipeline gas in which coal char is produced from powdered coal, the coal char is exposed to steam and hydrogen at elevated temperature and pressure to produce a mixture of gases and a portion of this mixture is subjected to methanation and subsequent drying, the improvement wherein the hydrogen for this process is produced by the electrical dissociation of water vapor in a solid oxygen-ion electrolyte dissociation cell.

References Cited
UNITED STATES PATENTS

| | | | |
|---|---|---|---|
| 1,889,714 | 11/1932 | Urbain | 23—211 |
| 2,044,704 | 2/1934 | Knowles | 204—101 |
| 3,347,647 | 10/1967 | Feldkirchner et al. | 48—197 |

MORRIS O. WOLK, Primary Examiner

R. E. SERWIN, Assistant Examiner

U.S. Cl. X.R.

23—211; 48—101, 197, 202, 210; 204—101